United States Patent
Ikedaya et al.

(10) Patent No.: US 9,908,522 B2
(45) Date of Patent: Mar. 6, 2018

(54) CONTROL DEVICE OF HYBRID VEHICLE

(71) Applicant: MITSUBISHI JIDOSHA KOGYO KABUSHIKI KAISHA, Tokyo (JP)

(72) Inventors: Hisakazu Ikedaya, Okazaki (JP); Tadayoshi Hirao, Okazaki (JP); Shigetoshi Hirano, Toyoake (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/060,093

(22) Filed: Mar. 3, 2016

(65) Prior Publication Data
US 2016/0257299 A1 Sep. 8, 2016

(30) Foreign Application Priority Data
Mar. 4, 2015 (JP) ................................. 2015-042853

(51) Int. Cl.
*B60K 6/44* (2007.10)
*B60W 20/15* (2016.01)
(Continued)

(52) U.S. Cl.
CPC ............... *B60W 20/15* (2016.01); *B60K 6/36* (2013.01); *B60K 6/387* (2013.01); *B60K 6/442* (2013.01); *B60W 10/06* (2013.01); *B60W 10/08* (2013.01); *B60W 20/00* (2013.01); *B60W 20/13* (2016.01); *B60W 20/17* (2016.01); *B60W 30/18072* (2013.01); *B60W 30/1882* (2013.01); *B60W 20/10* (2013.01); *B60W 2400/00* (2013.01); *B60W 2510/244* (2013.01); *B60W 2540/10* (2013.01); *B60W 2550/13* (2013.01); *B60W 2710/0644* (2013.01); *B60W 2710/0666* (2013.01); *B60W 2710/0677* (2013.01);
(Continued)

(58) Field of Classification Search
CPC .................................. B60W 20/15; H02J 1/10
See application file for complete search history.

(56) References Cited

U.S. PATENT DOCUMENTS 7,421,321 B2 * 9/2008 Breed ..................... B60C 11/24
340/442
7,518,254 B2 * 4/2009 Donnelly ................. B60L 7/06
290/1 A (Continued)

FOREIGN PATENT DOCUMENTS

JP 2003-9305 A 1/2003

*Primary Examiner* — Alex C Dunn
(74) *Attorney, Agent, or Firm* — Birch, Stewart, Kolasch & Birch, LLP

(57) ABSTRACT

A control device of a vehicle enables an engine to be operated at an operating point with a good fuel consumption efficiency, to perform power generation, without causing a sense of incongruity about noise or vibrations to a driver. With the control device, the engine is operated so that generated power of a generator increases in response to electric power required of the vehicle. Thus, the engine can be operated at an operating point with a satisfactory fuel consumption efficiency. When in an acceleration state, the engine is operated so that the increase amount of generated power is set to be larger than when in a deceleration state. When in the deceleration state, the engine is operated so that an increase in generated power is suppressed and an increase in noise is curbed.

7 Claims, 7 Drawing Sheets

(51) Int. Cl.
    *B60K 6/442*      (2007.10)
    *B60W 10/06*      (2006.01)
    *B60W 10/08*      (2006.01)
    *B60W 20/00*      (2016.01)
    *B60W 30/18*      (2012.01)
    *B60W 30/188*     (2012.01)
    *B60W 20/17*      (2016.01)
    *B60W 20/13*      (2016.01)
    *B60K 6/36*       (2007.10)
    *B60K 6/387*      (2007.10)
    *B60W 20/10*      (2016.01)

(52) U.S. Cl.
    CPC . *B60W 2710/086* (2013.01); *B60W 2710/087* (2013.01); *B60W 2710/248* (2013.01); *Y02T 10/6286* (2013.01); *Y10S 903/93* (2013.01)

(56) References Cited

U.S. PATENT DOCUMENTS

| | | | |
|---|---|---|---|
| 7,610,124 B2* | 10/2009 | Wakashiro | B60K 6/485 137/260 |
| 8,061,463 B2* | 11/2011 | Kitano | B60K 6/485 180/65.285 |
| 8,296,032 B2* | 10/2012 | Wang | B60K 6/445 701/51 |
| 8,781,664 B2* | 7/2014 | Sujan | B60W 10/02 180/65.25 |
| 9,090,247 B2* | 7/2015 | Kato | B60W 10/06 |
| 2002/0195288 A1 | 12/2002 | Komiyama et al. | |
| 2006/0005736 A1* | 1/2006 | Kumar | B60L 11/1801 105/1.4 |
| 2007/0029124 A1* | 2/2007 | DasGupta | B60L 3/0046 429/218.1 |
| 2008/0246338 A1* | 10/2008 | Donnelly | B60L 11/123 307/54 |
| 2011/0288765 A1* | 11/2011 | Conway | G01C 21/3469 701/533 |
| 2013/0229154 A1* | 9/2013 | Benjamin | G01R 31/3606 320/132 |
| 2013/0297113 A1* | 11/2013 | Banker | B60W 20/00 701/22 |
| 2014/0163799 A1* | 6/2014 | Niimi | B60K 6/445 701/22 |
| 2016/0064972 A1* | 3/2016 | Stefanopoulou | H02J 7/0021 320/116 |

* cited by examiner

CONTROL DEVICE OF HYBRID VEHICLE

The entire disclosure of Japanese Patent Application No. 2015-042853 filed on Mar. 4, 2015 is expressly incorporated by reference herein.

TECHNICAL FIELD

This invention relates to a control device of a hybrid vehicle equipped with a travel motor and a generator driven by an engine.

BACKGROUND ART

In recent years, hybrid vehicles designed to obtain a driving force for the vehicle by a combination of a travel motor and an engine have been developed and have come into widespread practical use. Among hybrid vehicles under development and in widespread practice use is a vehicle which drives a generator by an engine to generate electricity, and charges a battery for supplying electricity to a travel motor (PHV), and a vehicle in which a battery can be charged even by an external commercial power supply (PHEV).

Known as such hybrid vehicles are those capable of switching among the following modes according to the operating status: an EV mode in which driving wheels are driven, with only a travel motor being used as a power source; a series mode in which a travel motor is used as a power source, and a generator is driven by an engine supply electric power to a battery and the travel motor; and a parallel mode in which an engine and a travel motor are both used as power sources.

The hybrid vehicle is configured such that the generator is driven by the operation of the engine and generated electric power is charged into the battery. For the driving of the generator, a target engine speed and a target engine torque are set, and the generator is driven, with the engine being controlled, so as to obtain desired generated power, with the result, that constant generated power is obtained (see JP-A-2003-9305). Thus, irrespective of the target charge power conformed to the status of the battery, the engine is operated at a constant engine speed, and a driver never feels a sense of incongruity due to changes in the engine speed.

PRIOR ART DOCUMENTS

Patent Documents

Patent Document 1: JP-A-2003-9305

SUMMARY OF THE INVENTION

Problems to be Solved by the Invention

With the hybrid vehicle hitherto known, the desired engine speed and torque are set in conformity with the required generated power, but the operating state of the hybrid vehicle is currently no taken into consideration. Depending on the operating state of the hybrid vehicle, therefore, when the generator is driven, there is actually a risk that the engine cannot be operated with the optimum efficiency of fuel consumption.

The present invention has been accomplished in the light of the above circumstances. It is an object of the invention to provide a control device of a hybrid vehicle, which can change the operating status of an engine for driving a generator in accordance with the operating state of the hybrid vehicle.

Means for Solving the Problems

A control device of a hybrid vehicle according to a first aspect of the present invention, for attaining the above object, is a control device of a hybrid vehicle including a travel motor for transmitting a driving force to driving wheels, a battery for supplying electric power to the travel motor, and a generator driven by the operation of an engine for generating required electric power including at least electric power for supply to the battery, the control device comprising: a fuel efficiency point deriving portion that finds an operating point with a satisfactory fuel consumption efficiency based on the rotational speed and torque of the engine; a required torque detection portion that detects a torque required of the hybrid vehicle to detect the operating state of the hybrid vehicle; and a power generation control portion that operates the engine so as to increase generated power in response to the required electric power, thereby operating the engine based on the operating point found by the fuel efficiency point deriving portion, to control the power generation of the generator, wherein if the operating state of the vehicle is detected by the required torque detection portion to be an acceleration state, the power generation control portion sets the increase amount of the generated power to be larger than if the operating state of the vehicle is detected to be a deceleration state.

With the present invention according to the first aspect, the engine is operated so as to increase generated power in response to the required electric power, in accordance with the operating state of the hybrid vehicle, thereby controlling the power generation of the generator. If, in this case, the required torque is in an acceleration state (slow acceleration state and steady state), the increase amount of generated power is set to be larger than if the required torque is in a deceleration state. Thus, it becomes possible to change the operating status of the engine, which drives the generator, in accordance with the operating state of the hybrid vehicle. Consequently, the operating point of the engine can be changed to an optimal level to adjust the generated power.

That is, the engine is operated in the vicinity of an operating point with a good fuel consumption efficiency in accordance with the operating state of the hybrid vehicle. If the required torque is in an acceleration state (slow acceleration state and steady state), the engine is operated so that the generated power is increased. In the case of a deceleration state, the engine is operated, with an increase in generated power being curbed and an increase in noise being suppressed. Thus, the engine is operated at an operating point with a good fuel consumption efficiency, whereby power generation can be performed, without a sense of incongruity about noise or vibrations being caused to the driver.

If the required torque is in an acceleration state (slow acceleration state and steady state), the increase amount of generated power is set to be large. Thus, the increase amount of the charging rate per unit time becomes larger than in a deceleration state. In the case of an acceleration state, the inclination of a change in the charging rate over time during charging is greater than in the case of a deceleration state.

A control device of a hybrid vehicle according to a second aspect of the present invention is the control device of a hybrid vehicle according to the first aspect, further comprising a charging status detection portion that detects the charging status of the battery, wherein the power generation control portion exercises power generation control over the generator when the charging rate detected by the charging status detection portion is equal to or less than a predetermined charging rate.

With the present invention according to the second aspect, when the charging rate of the battery is equal to or less than a predetermined charging rate, the operating point of the engine is changed to an optimal level to adjust the generated power. When the charging rate of the battery exceeds the predetermined charging rate, therefore, the operating time of the engine is shortened (the travelling time by the travel motor is lengthened), for example, by stopping the operation of the engine and supplying electric power from the battery to the travel motor, whereby power generation control can be performed. By so doing, charging can be inhibited from being performed in a state where the charging rate of the battery is so high as to exceed the predetermined charging rate, thus resulting in the flow of a large current and a high voltage.

That is if charging is performed by operating the engine so that generated power increases in a region where the charging rate of the battery is so high as to exceed the predetermined charging rate and electric power required of charging is low, it is conceivable that power supply to the battery increases to bring about a state of a large current flowing. If too large a current flows, too high a voltage emerges, imposing a heavy burden on the battery. In a state in which the charging rate of the battery is so high as to exceed the predetermined charging rate, it is possible not to carry out charging. Hence, a situation under which the voltage becomes so high that the battery is greatly burdened can be suppressed.

A control device of a hybrid vehicle according to a third aspect of the present invention is the control device of a hybrid vehicle according to the first or second aspect, further comprising an altitude detection portion that detects the altitude of the travelling place of the hybrid vehicle wherein the power generation control portion is configured such that the increase amount of the generated power when the altitude of the travelling place of the hybrid vehicle is higher than a reference altitude is set to be smaller than the increase amount of the generated power when the altitude of the travelling place of the hybrid vehicle is the reference altitude.

When the altitude of the travelling place is higher than the reference altitude, the rotational speed of the engine is required to be a high rotational speed in order to obtain the same output or the same generated power as that at the reference altitude.

With the present invention according to the third aspect, the power generation control portion is configured such that the increase amount of generated power in a high ground is set to be smaller than that in a low ground (level ground) at the reference altitude. If the traveling place is a high ground, therefore, generated power is kept lower than in a low ground (level ground), and the rotational speed of the engine is reduced to a low speed. Thus, noise due to the engine speed can be suppressed.

Since the increase amount of generated power is set to be smaller, if the travelling place is a high ground, than in a low ground (level ground), the increase amount of the charging rate per unit time is smaller, and the inclination of a change with time in the charging rate during charging in the high ground is smaller than in the low ground (level ground).

A control device of a hybrid vehicle according to a fourth aspect of the present invention is the control device of a hybrid vehicle according to any one of the first to third aspects, wherein the power generation control portion exercises power generation control over the generator in a series mode in which the travel motor is used as a travelling power source for the hybrid vehicle, and the generator is driven by the engine to supply electric power to at least one of the battery and the travel motor.

With the present invention concerned with the fourth aspect, the operating status of the engine for driving the generator in accordance with the operating state of the hybrid vehicle is changed in the series mode to change the operating point of the engine to the optimal level, whereby the generated power can be adjusted.

Effects of the Invention

According to the present invention described above, the operating status of the engine for driving the generator can be changed in accordance with the operating state of the hybrid vehicle.

MODE FOR CARRYING OUT THE INVENTION

Figure 1:
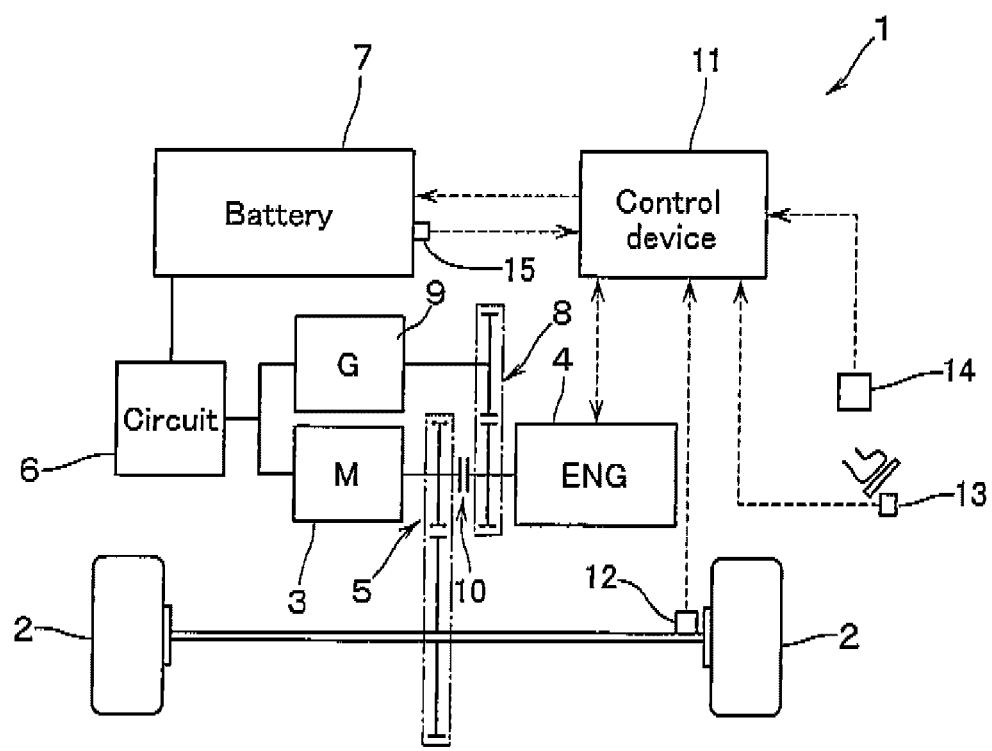
FIG. 1 is a schematic configuration diagram of an entire hybrid vehicle loaded with a control device according to an embodiment of the present invention.

The entire configuration of a hybrid vehicle will be described based on FIG. 1. FIG. 1 shows the schematic configuration of an entire hybrid vehicle loaded with a control device according to an embodiment of the present invention.

As shown in the drawing, a hybrid vehicle (vehicle) 1 is equipped with a travel motor 3 for transmitting power to driving wheels 2, and an engine 4. The driving force of the travel motor 3 is transmitted to the driving wheels 2 via a transmission mechanism 5. To the travel motor 3, a battery 7 is connected via a circuit 6 such as an inverter. Electric power responsive to the pedaling of an occupant is supplied from the battery 7 to the travel motor 3 via the circuit 6.

A generator 9 is connected to the engine 4 via an output system 8, and the generator 9 is connected to the battery 7 (and the travel motor 3) via the circuit 6. The output system 8 is connected to the generator 9 on one hand, and connected to the transmission mechanism 5 via a clutch 10 on the other hand.

When the engine 4 is operated in accordance with the operating state of the vehicle 1, the driving force of the engine 4 is transmitted to the generator 9 via the output system 8. The generator 9 is rotated (driven) by the operation of the engine 4 to perform power generation. Electric power generated by the generator 9 is supplied to the battery 7 and the travel motor 3. When the output system 8 and the transmission mechanism 5 are connected by the clutch 10 in accordance with the operating state of the vehicle 1, the driving force of the engine 4 is transmitted to the generator 9 and the driving wheels 2.

The vehicle 1 is provided with a control device 11 for overall control of various devices, and information on the rotational speed of the engine 4 and information from a vehicle speed sensor 12 are inputted to the control device 11. The vehicle 1 is equipped with a charging status detection portion 15 that detects the charging status (charging rate or state of charge, SOC) of the battery 7, and information from the charging status detection portion 15 is inputted to the control device 11. The vehicle 1 is also equipped with an accelerator position sensor (APS) 13 as a required torque detection portion, and detected information (information on required torque) from the APS 13 is inputted to the control device 11. The vehicle 1 is further equipped with an atmospheric pressure measuring portion 14 as an altitude detection portion, and detected information from the atmospheric pressure measuring portion 14 is inputted to the control device 11.

As the required torque detection portion, a portion that derives the required torque based on the rotational speed of the travel motor 3 can be used instead of (in addition to) the accelerator position sensor (APS) 13.

The vehicle 1 configured as above has an EV mode in which the travel motor 3 is used as a power source for the travelling of the vehicle; and a series mode in which the travel motor 3 is used as the power source for the travelling of the vehicle, and the engine 4 is used as a power source for the generator 9. The vehicle 1 also has a parallel mode in which the travel motor 3 and the engine 4 are used as the power sources for the travel of the vehicle. The respective operating modes are suitably selected and switched in accordance with the travelling state of the vehicle 1.

The control device of a hybrid vehicle according to the embodiment of the present invention is characterized, for example, by power generation control over the generator 9 during operation in the series mode. The power generation control according to the one embodiment of the present invention will be concretely described based on FIGS. 2 to 9.

Figure 2:
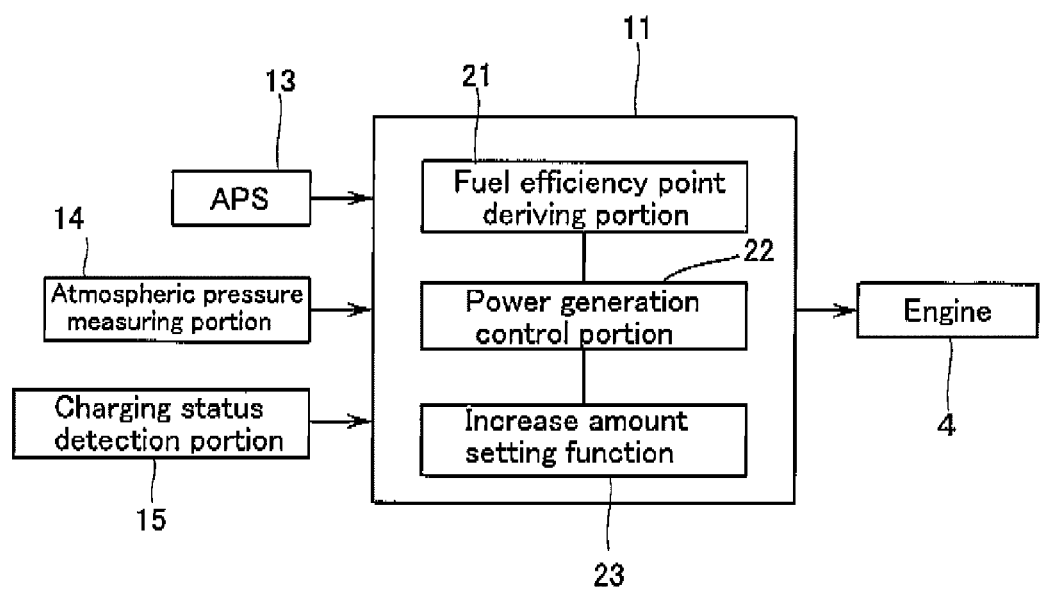
FIG. 2 is a block diagram for execution of power generation control.
Figure 3:
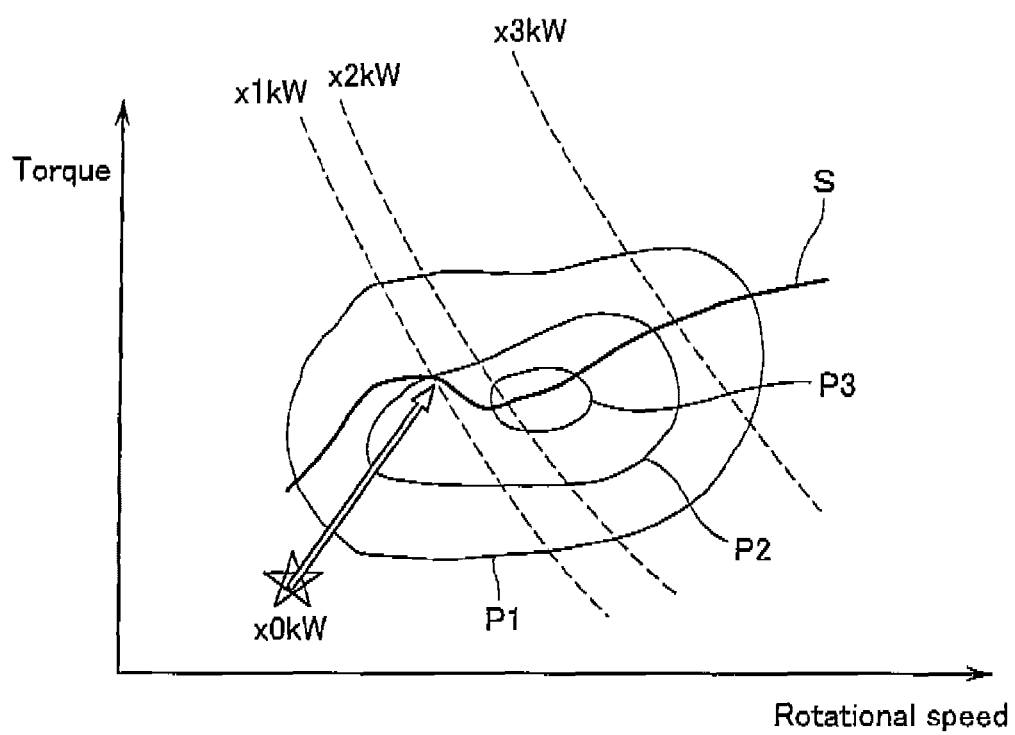
FIG. 3 is a map illustrating an operating point for generated power.
Figure 4:
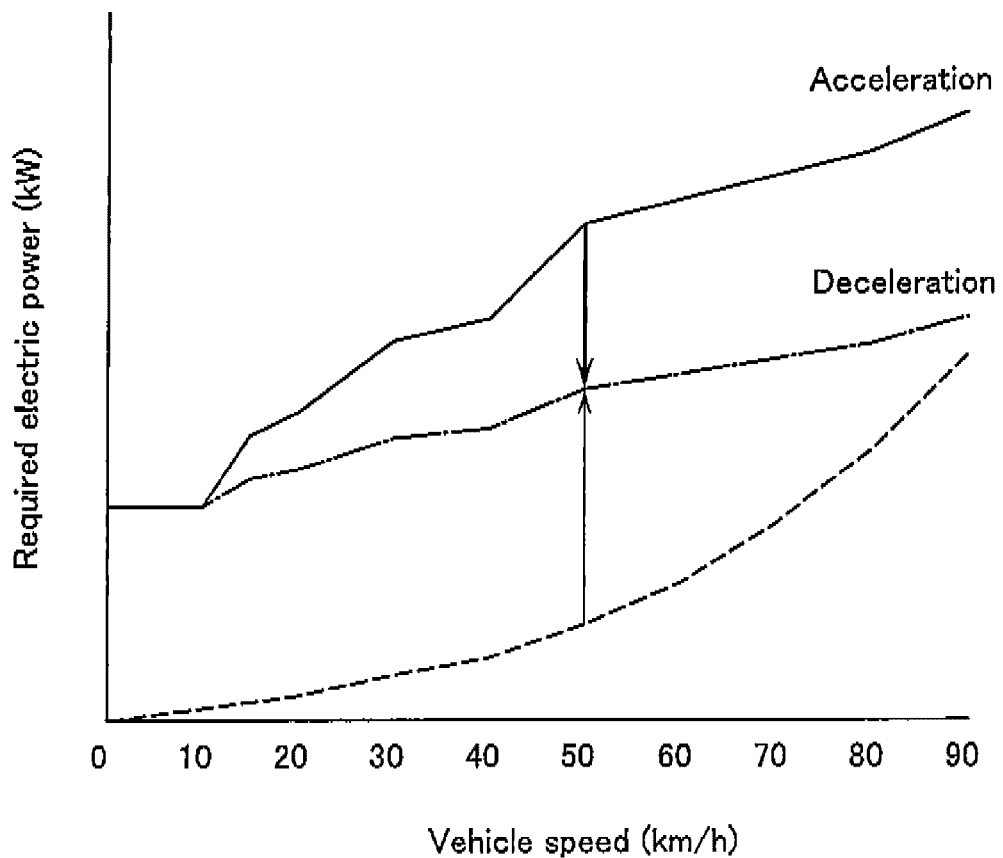
FIG. 4 is a map illustrating the relationship between a vehicle speed and generated power (required electric power).
Figure 5:
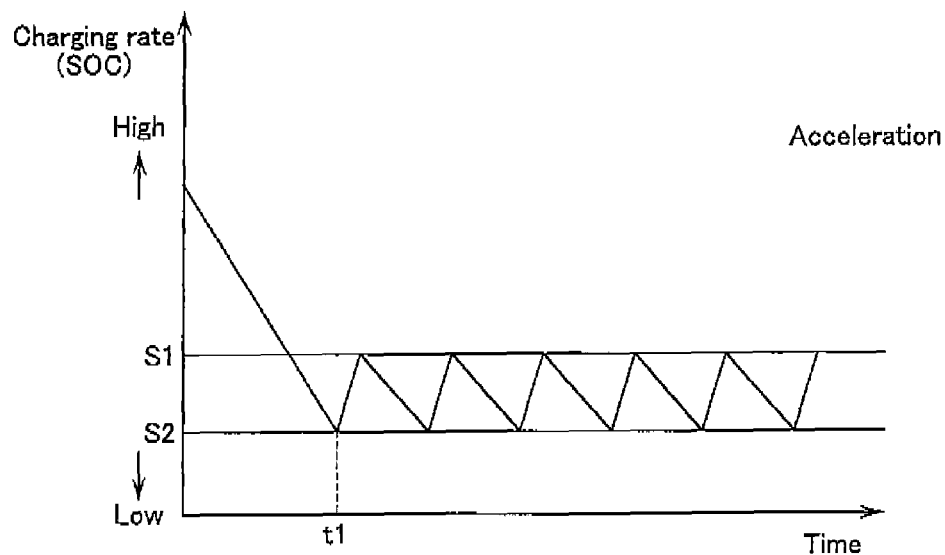
FIG. 5 is a graph illustrating the time course (change over time) of the charging rate (state of charge or SOC; power generation control) during acceleration.
Figure 6:
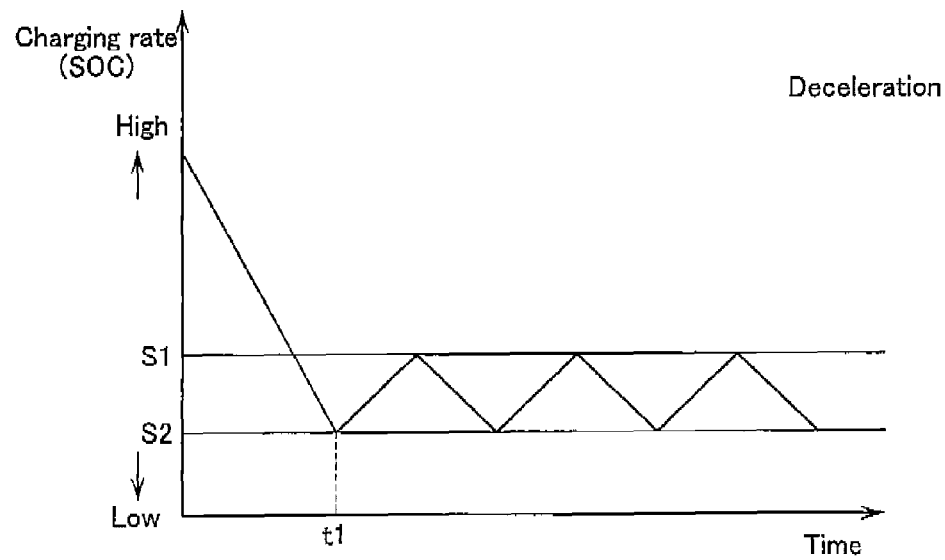
FIG. 6 is a graph illustrating the time course of the charging rate (SOC; power generation control) during deceleration.
Figure 7:
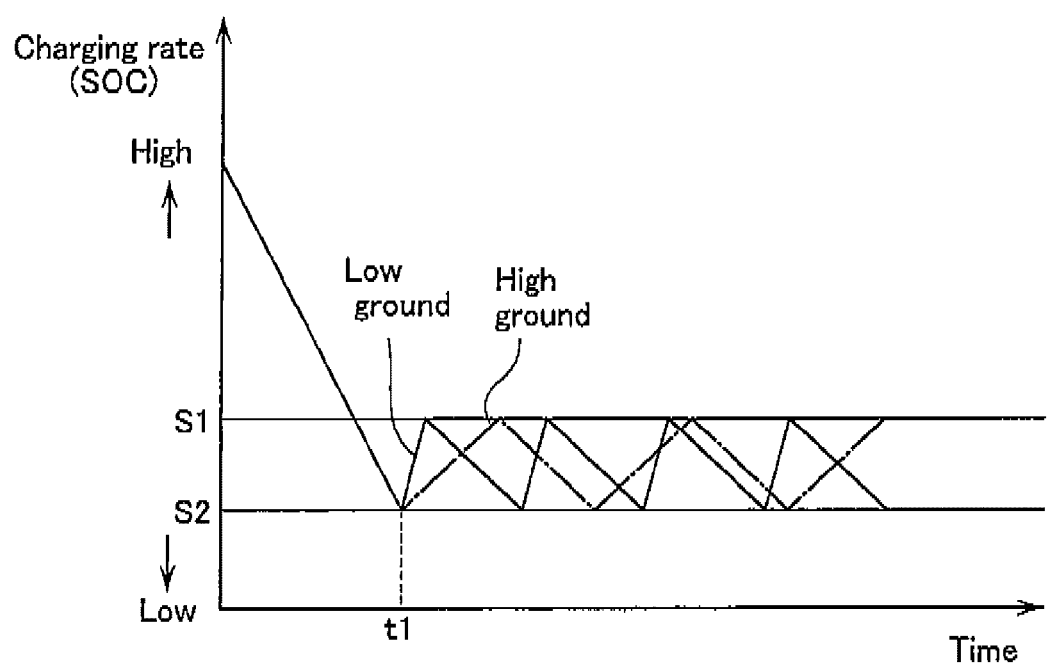
FIG. 7 is a graph illustrating the time course of the charging rate (SOC; power generation control) in a low ground and a high ground.
Figure 8:
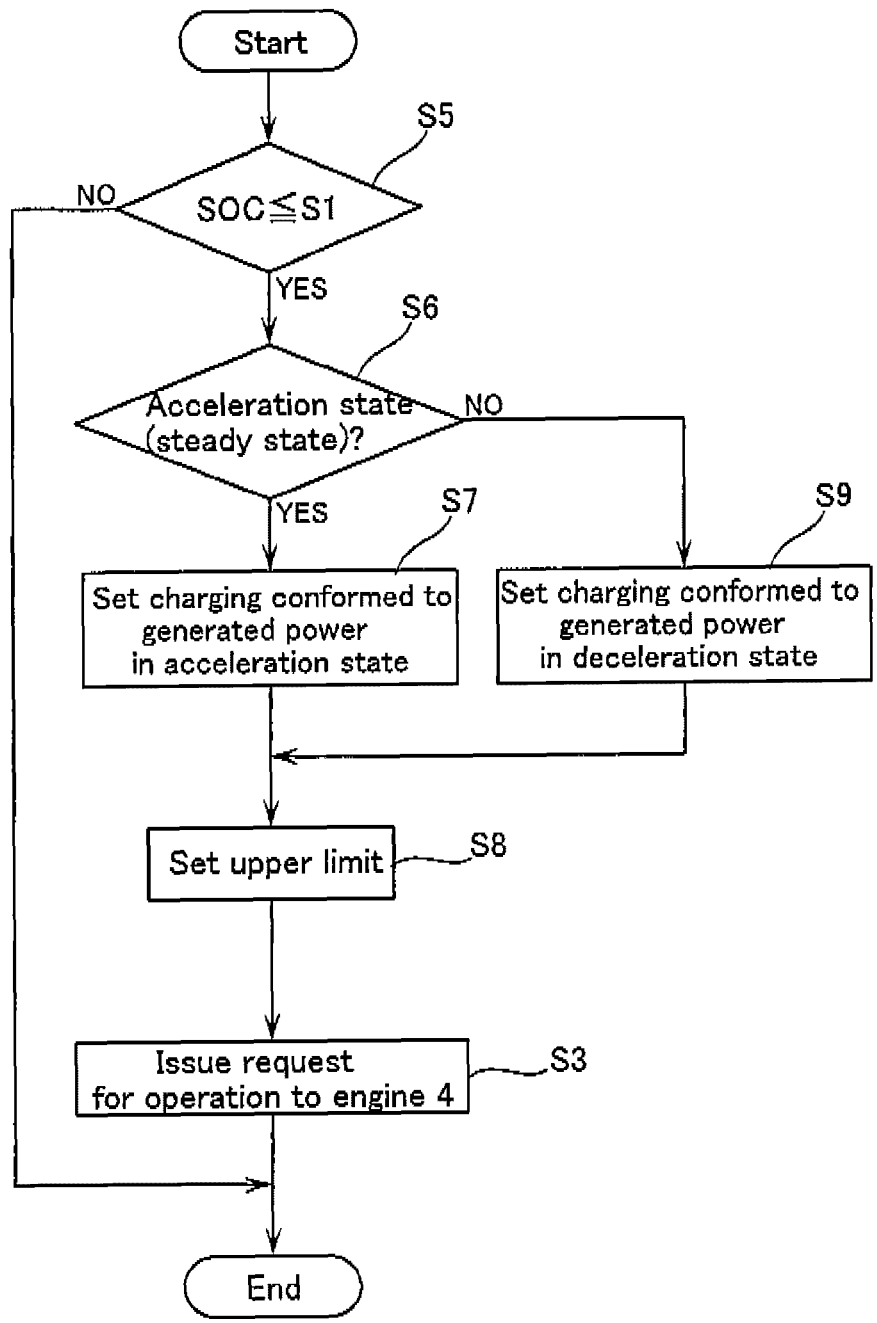
FIG. 8 is a flow chart for power generation control.

FIG. 2 shows a block configuration for exercising power generation control by the control device of a hybrid vehicle according to the embodiment of the present invention. FIG. 3 shows a map illustrating the operating point for generated power in conjunction with the relationship between the torque and the rotational speed of the engine. FIG. 4 shows a map illustrating the relationship between the vehicle speed and generated power (required electric power) FIG. 5 shows the time course (change over time) of the charging rate (time course of power generation control) during acceleration. FIG. 6 shows the time course of the charging rate (time course of power generation control) during deceleration. FIG. 7 shows the time course of the charging rate (time course of power generation control) during travel in a low ground (level ground) and a high ground. FIG. 8 shows a flow chart illustrating an example of processings for power generation control in the control device of a hybrid vehicle according to the embodiment of the present invention.

As shown in FIG. 2, detected information from the APS 13, detected information from the atmospheric pressure measuring portion 14, and detected information from the charging status detection portion 15 are inputted to the control device 11. The control device 11 is equipped with a fuel efficiency point deriving portion 21 for obtaining an operating point with a good fuel consumption efficiency based on the rotational speed and torque of the engine 4. The control device 11 is also equipped with a power generation control portion 22 for operating the engine 4 in accordance with the required electric power for power generation, and is further equipped with an increase amount setting function 23 for operating the engine 4 so that generated power increases in accordance with the operating state of the vehicle 1 (see FIG. 1).

The fuel efficiency point deriving portion 21 stores the map shown in FIG. 3. As shown in FIG. 3, regions where the fuel consumption efficiency is satisfactory in connection with the relation between the torque and rotational speed of the engine 4 are set, for example, by equal fuel efficiency lines P1, P2, P3 (lines formed by connecting points with the same fuel efficiencies; indicated by dotted lines in the drawing; fuel efficiency of P1<fuel efficiency of P2<fuel efficiency of P3). For example, operating points S (indicated by a solid line in the drawing) at which the fuel efficiency of the engine 4 is good for generation of generated powers x0 kW, x1 kW, x2 kW and x3 kW (x0<x1<x2<x3), indicated by dashed lines in the drawing, are set.

Based on the map shown in FIG. 3, generated power is increased in accordance with the operating state of the vehicle 1. By so doing, the generator 9 is driven, with the operation of the engine 4 being controlled at the rotational speed and torque at the operating point S with a good fuel consumption efficiency, to generate required electric power (power generation control portion 22).

The increase amount setting function 23 serves to set the increase amount of generated power to be larger, when the torque required of the engine (the torque derived based on detected information from the APS) is in an acceleration state (slow acceleration state and steady state), than in a deceleration state. That is, the increase amount setting function 23 stores the map shown in FIG. 4. An indicated by a dashed line in FIG. 4, required electric power serving as a reference is set in accordance with the vehicle speed and, in accordance with the required torque, generated power is set to be increased when in the acceleration state (slow acceleration state and steady state) or in the deceleration state. When the required torque is in the acceleration state (slow acceleration state and steady state; indicated by a solid line in FIG. 4), the increase amount of generated power is set to be larger than in the deceleration state (indicated by a dashed dotted line in FIG. 4).

If the engine 4 is operated in a region outside the equal fuel efficiency line P1 (the region outside P1 with a low fuel consumption efficiency) in the map shown in FIG. 4 at the reference required power x0 kW, for example, the fuel consumption efficiency is lower than P1, and the operation of the engine is performed in the region with a poor fuel consumption efficiency. In the present embodiment, generated power is increased in accordance with the operating state, and generated power is increased, when in the acceleration state (slow acceleration state and steady state) or in the deceleration state, in response to the required torque. Thus, the generated power is increased to x1 kW, x2 kW, and the engine 4 is operated in the region inside the equal fuel efficiency lines P2, P3 in the map shown in FIG. 3, so that the operation in the region with the good fuel consumption efficiency takes place.

In the acceleration state (slow acceleration state and steady state), the increase amount of generated power is set to be larger than in the deceleration state. Thus, when in the acceleration state (slow acceleration state and steady state), the engine 4 is operated so that generated power increases. When in the deceleration state, the engine 4 is operated in such a state that an increase in generated power is suppressed and an increase in noise is curbed. Consequently, the engine can be operated at the operating point with a good fuel consumption efficiency, without a sense of incongruity being caused to the driver about noise or vibrations, whereby power generation can be performed.

As will be described concretely later, when the torque required of the vehicle 1 is in the acceleration state (slow acceleration state and steady state), as compared with the deceleration state, the increase amount of generated power is set to be large, and the amount of an increase in the charging rate per unit time becomes large. In the case of the acceleration state, the inclination of the change in the charging rate over time during charging is greater than the inclination of the change in the charging rate over time during charging when in the deceleration state.

The power generation control portion 22 operates the engine based on the map shown in FIG. 3, when the SOC detected by the charging status detection portion 15 is equal to or less than a predetermined charging rate (for example, only when it is 30% or less). That is, only when the SOC of the battery 7 is equal to or less than the predetermined charging rate, power generation control over the generator 9 (see FIG. 1) is exercised.

That is, as shown in FIGS. 5 and 6, the SOC of the battery 7 (see FIG. 1) decreases as the travel by the travel motor 3 (see FIG. 1) proceeds. At a time when the SOC falls to a predetermined charging rate S1 or lower, and further lowers by several percent to reach a charging rate S2 (time t1), the engine 4 (see FIG. 1) is operated to carry out charging. When the SOC is equal to or less than the predetermined charging rate S1, charging and discharging are repeated between the predetermined charging rate S1 and the charging rate S2.

As stated above, when the torque required of the vehicle 1 is in the acceleration state (slow acceleration state and steady state), the increase amount of generated power is set to be larger than in the deceleration state. When in the acceleration state (slow acceleration state and steady state) shown in FIG. 5, therefore, the increase amount of the charging rate per unit time in the region at the predetermined charging rate S1 or lower is larger than when in the deceleration state shown in FIG. 6. Thus, the inclination of the time course of the charging rate during charging in the acceleration state (see FIG. 5) is greater than the inclination of the time course of the charging rate during charging in the deceleration state (see FIG. 5).

In the region where the SOC of the battery 7 is the predetermined charging rate S1 or lower, the operation of the engine 4 is stopped, and electric power continues to be supplied from the battery 7 to the travel motor 3, until the SOC comes to the charging rate S2. Thus, even in the region where the SOC is the predetermined charging rate S1 or lower, power generation control can be performed, with the operating time of the engine 4 being shortened (the travelling time by the travel motor 3 being lengthened).

As a result, power generation in the state where the SOC of the battery 7 is so high as to exceed the predetermined charging rate S1 and a large amount of current flows to raise the voltage of the battery 7 can be suppressed.

In the state where the SOC of the battery 7 is lower than the predetermined charging rate S1, the electric power required to be charged (required electric power) is so low that the operation of the engine 4 for generating the required electric power is likely to be an operation in a region with a low fuel consumption efficiency, a region at a low rotational speed and a low torque. In the present embodiment, when the SOC of the battery 7 is equal to or lower than the predetermined charging rate S1, the operating point of the engine 4 is changed to an optimal point, thereby adjusting the generated power and performing power generation. Thus, the operation of the engine 4 in the region where the fuel consumption efficiency is low can be suppressed.

If charging is performed in a region where the SOC of the battery 7 is so high as to exceed the predetermined charging rate S1, namely, a region where required electric power is low, the supply of electric power to the battery 7 is assumed to be great, causing a high current to flow. The flow of too high a current to the battery 7 results in too high a voltage, imposing a heavy burden on the battery 7. According to the present embodiment, in a state where the charging rate of the battery 7 is so high as to exceed the predetermined charging rate S1, it is possible not to carry out charging. Thus, the battery 7 can be inhibited from shouldering a heavy burden due to too high a voltage.

In the foregoing embodiment, when the SOC of the battery 7 is equal to or lower than the predetermined charging rate S1, the operating point of the engine 4 is changed to an optimal level in accordance with the acceleration state or the deceleration state, thereby adjusting the generated power. Regardless of the SOC of the battery 7, however, it is possible to change the operating point of the engine 4 to the optimal point at any time in accordance with the acceleration state or the deceleration state, thereby adjusting the generated power.

The increase amount setting function 23 is capable of setting the increase amount of generated power to be smaller, when the altitude of the travelling place of the vehicle 1 (the altitude is derived based on detected information from the atmospheric pressure measuring portion 14) is higher (in a high ground) than a reference altitude (in a low ground), than the increase amount of generated power when in the low ground. When the altitude of the travelling place of the vehicle 1 is higher than the reference altitude, namely, when the travelling place is a high ground, the engine needs a high rotational speed, in order to give the torque with the same output or the same generated power as in a low ground.

In the present embodiment, the increase amount of generated power when in a high ground is set do be smaller than the increase amount of generated power when in a low ground. When the travelling place is a high ground, therefore, the generated power is kept lower than in a low ground. Thus, noise due to the rotational speed of the engine can be reduced.

As shown in FIG. 7, when the SOC of the battery 7 decreases to the predetermined charging rate S1 or less, charging and discharging are repeated between the predetermined charging rate S1 and the charging rate S2. For a high ground as the travelling place, the increase amount of generated power is set to be smaller than the increase amount of generated power for a low ground. Thus, the increase amount of the charging rate per unit time for a high ground becomes smaller than for a low ground. Hence, the inclination of the change in the charging rate over time during charging in the case of a high ground (the inclination is indicated by dashed double-dotted lines) is smaller than the inclination of the change in the reference charging rate (charging rate in the case of a low ground) over time during charging (the inclination is indicated by solid lines).

Processings as an example of power generation control by the control device of a hybrid vehicle mentioned above will be described based on FIG. 8.

Required electric power is set based on electric power for driving the vehicle 1, the charged electric power of the battery 7, and the consumed electric power of accessories. In response to the required electric power, power generation is performed in accordance with the direct intention of the driver or the operating state of the vehicle 1. For example, upon handling by the driver for performing charging, or when the state of the vehicle 1 (battery 7) is a state requiring compulsory charging, it is determined whether the vehicle is in a charge mode, a mode in which the engine 4 is driven to charge the battery 7.

Upon start of the processings, it is determined in Step S5 whether the SOC of the battery 7 is equal to or less than the predetermined charging rate S1. If it is determined in Step S5 that the SOC of the battery 7 exceeds the predetermined charging rate S1, the vehicle is judged to be travelling in a state which is not in the charge mode, and in which the SOC is high. Since the vehicle is travelling without requiring power generation by the engine 4 (EV travel), the processings end.

If it is determined in Step S5 that the SOC of the battery 7 is equal to or less than the predetermined charging rate S1, namely, that the state at the charging rate equal to or less than the predetermined charging rate S1 as shown in FIGS. 5 and 6 is achieved, it is determined in Step S6 whether the required torque is in an acceleration state (gentle acceleration state and steady state). That is based on the required torque of the vehicle 1 derived based on the detected information from the APS 13, it is determined whether the required torque is in the acceleration state (gentle acceleration state and steady state).

Upon determination in Step S6 that the required torque is in the acceleration state (gentle acceleration state and steady state), charging conformed to generated power in the acceleration state is set in Step S7. That is, generated power is set in the preset increase amount in the acceleration state (larger increase amount than in the deceleration state; see FIGS. 3, 4) so that charging is started at the time t1 (charging rate S2) after a lapse of time until the required torque of the vehicle 1 is judged.

The upper limit of the SOC is set (predetermined charging rate S1) in Step S8. Then, in Step S3, a request for operation is issued to the engine 4 so that generated power in the acceleration state is attained, and power generation is performed by the generator 9, bringing the processing to an end. By repeating the processings, charging and discharging are repeated between the predetermined charging rate S1 and the charging rate S2 when the SOC is equal to or less than the set upper limit (predetermined charging rate S1) (see FIG. 5).

If it is determined in Step S6 that the vehicle 1 is not in the acceleration state (gentle acceleration state and steady state), namely, that the vehicle 1 is in the deceleration state, charging conformed to generated power in the deceleration state is set in Step S9. That is, generated power is set in the preset increase amount in the deceleration state (smaller increase amount than in the acceleration state; see FIGS. 3, 4) so that charging is started at the time t1 (charging rate S2) after a lapse of time until the required torque of the vehicle 1 is judged.

The upper limit of the SOC is set (predetermined charging rate S1) in Step S8. Then, in Step S3, a request for operation is issued to the engine 4 so that generated power in the deceleration state is attained, and power generation is performed by the generator 9, bringing the processing to an end. By repeating the processings, charging and discharging are repeated between the predetermined charging rate S1 and the charging rate S2 when the SOC is equal to or less than the set upper limit (predetermined charging rate S1) (see FIG. 6).

In the settings for charging in Step S7 and Step S9, if the travelling place is a high ground, generated power is kept lower than in a low ground, and generated power is adjusted in order to reduce noise due to the engine speed, by lowering the rotational speed of the engine 4. That is, in connection with the generated power in the acceleration state and the generated power in the deceleration state, adjustments are made such that the increase amount of generated power becomes small if the travelling place is a high ground in comparison with a low ground.

With the control device of a hybrid vehicle as described above, power generation by the generator 9 is controlled by operating the engine 4 so that generated power increases in response to required electric power depending on the operating state of the vehicle 1. Thus, the engine 4 can be operated at the operating point with a satisfactory fuel consumption efficiency. In this case, if the required torque is in the acceleration state (slow acceleration state and steady state), the increase amount of generated power is set to be larger than in the deceleration state. Thus, when in the acceleration state (slow acceleration state and steady state), the engine 4 is operated so that generated power will be high. When in the deceleration state, the engine 4 is operated so that an increase in generated power is suppressed and an increase in noise is curbed. Thus, the engine 4 is operated at an operating point with a good fuel consumption efficiency, without a sense of incongruity about noise or vibrations being caused to the driver. In this manner, power generation can be performed.

Consequently, the operating status of the engine 4 for driving the generator 9 can be changed in accordance with the operating state of the vehicle 1 (slow acceleration state and steady state, or deceleration state). As a result, the engine 4 is operated at an operating point with a good fuel consumption efficiency, so that generated power can be adjusted.

INDUSTRIAL APPLICABILITY

The present invention can be utilized in industrial fields involving a control device of a hybrid vehicle equipped with a travel motor and a generator driven by an engine.

Explanations of Letters or Numerals

1 Hybrid vehicle (vehicle)
2 Driving wheel
3 Travel motor
4 Engine
5 Transmission mechanism
6 Circuit
7 Battery
8 Output system
9 Generator
10 Clutch
11 Control device
12 Vehicle speed sensor
13 Accelerator position sensor (APS)
14 Atmospheric pressure measuring portion
15 Charging status detection portion
21 Fuel efficiency point deriving portion 22 Power generation control portion
23 increase amount setting function

The invention claimed is:

1. A control device of a hybrid vehicle including
a travel motor for transmitting a driving force to driving wheels,
a battery for supplying electric power to the travel motor, and
a generator driven by an operation of an engine for generating required electric power including at least electric power for supply to the battery,
the control device, comprising:
a fuel efficiency point deriving portion that finds an operating point with a satisfactory fuel consumption efficiency based on a rotational speed and a torque of the engine;
a required torque detection portion that detects a torque required of the hybrid vehicle to detect an operating state of the hybrid vehicle; and
a power generation control portion that operates the engine so as to increase generated power in response to the required electric power, thereby operating the engine based on the operating point found by the fuel efficiency point deriving portion, to control power generation of the generator,
wherein when the operating state of the vehicle detected by the required torque detection portion to be an acceleration state, the power generation control portion sets an increase amount of the generated power to be larger than when the operating state of the vehicle is detected to be a deceleration state, such that an increase per unit time in a charge rate during the acceleration state is larger than an increase per unit time in the charge rate during the deceleration state, and
wherein the increase amount of the generated power per a unit time is set to be larger when in the acceleration state than in the deceleration state, and an inclination of a change in a charging rate over time during charging is set to be larger when in the acceleration state than in the deceleration state.

2. The control device of a hybrid vehicle according to claim 1, further comprising:
a charging status detection portion that detects a charging status of the battery,
wherein the power generation control portion exercises power generation control over the generator when the charging rate detected by the charging status detection portion is equal to or less than a predetermined charging rate.

3. The control device of a hybrid vehicle according to claim 1, further comprising:
an altitude detection portion that detects an altitude of a travelling place of the hybrid vehicle,
wherein the power generation control portion is configured such that the increase amount of the generated power when the altitude of the travelling place of the hybrid vehicle is higher than a reference altitude is set be smaller than the increase amount of the generated power when the altitude of the travelling place of the hybrid vehicle is the reference altitude.

4. The control device of a hybrid vehicle according to claim 2, further comprising:
an altitude detection portion that detects an altitude of a travelling place of the hybrid vehicle,
wherein the power generation control portion is configured such that the increase amount of the generated power when the altitude of the travelling place of the hybrid vehicle is higher than a reference altitude is set to be smaller than the increase amount of the generated power when the altitude of the travelling place of the hybrid vehicle is the reference altitude.

5. The control device of a hybrid vehicle according to claim 1, wherein
the power generation control portion exercises power generation control over the generator in a series mode in which the travel motor is used as a travelling power source for the hybrid vehicle, and the generator is driven by the engine to supply electric power to at least one of the battery and the travel motor.

6. The control device of a hybrid vehicle according to claim 2, wherein
the power generation control portion exercises power generation control over the generator in a series mode in which the travel motor is used as a travelling power source for the hybrid vehicle, and the generator is driven by the engine to supply electric power to at least one of the battery and the travel motor.

7. The control device of a hybrid vehicle according to claim 3,
wherein the power generation control portion exercises power generation control over the generator in a series mode in which the travel motor is used as a travelling power source for the hybrid vehicle, and the generator is driven by the engine to supply electric power to at least one of the battery and the travel motor.

* * * * *